United States Patent [19]

Pittelko

[11] Patent Number: 4,938,424
[45] Date of Patent: Jul. 3, 1990

[54] FOOD PROCESSING VAT

[75] Inventor: Allen J. Pittelko, Oakfield, Wis.

[73] Assignee: Damrow Company, Inc., Fond du Lac, Wis.

[21] Appl. No.: 391,131

[22] Filed: Aug. 8, 1989

[51] Int. Cl.$^5$ ............................................. B01F 7/32
[52] U.S. Cl. ....................................... 241/98; 99/642; 241/101.1; 241/199.12
[58] Field of Search .......... 241/65, 98, 101.1, 199.12; 99/460, 461, 462, 479, 477, 458, 559, 456

[56] References Cited

U.S. PATENT DOCUMENTS

| | | | |
|---|---|---|---|
| 3,858,855 | 1/1975 | Hazen | 241/98 |
| 4,206,880 | 6/1980 | Stanton | 241/98 |
| 4,321,860 | 3/1982 | Hazen | 241/98 X |

Primary Examiner—Timothy V. Eley
Attorney, Agent, or Firm—Andrus, Sceales, Starke & Sawall

[57] ABSTRACT

An improved food processing vat including an outer shell, and a vessel to contain a food product, such as curds and whey, is spaced inwardly of the shell and is composed of a pair of generally cylindrical sections which intersect along vertical apices. Each apex is generally curved and has a radius in the range of 1:6 to 1:12 with respect to the radius of the cylindrical sections. A heating medium, such as steam, is introduced into the area beneath the vessel and the outer shell at locations diposed outwardly of each apex. An agitator unit is disposed in each cylindrical section and each unit includes a rotatable vertical shaft and a frame extends radially from each shaft. Each frame consists of a series of vertical and horizontal blades and a swinging blade is mounted on the outer end of each frame and is freely swingable from a cutting position where the sharp edge of the blade leads in the direction of rotation to an angular stirring position where the side of the blade faces in the direction of rotation. In addition, a lower frame section is pivotally connected to the lower edge of each frame and is movable between a cutting and stirring position.

22 Claims, 3 Drawing Sheets

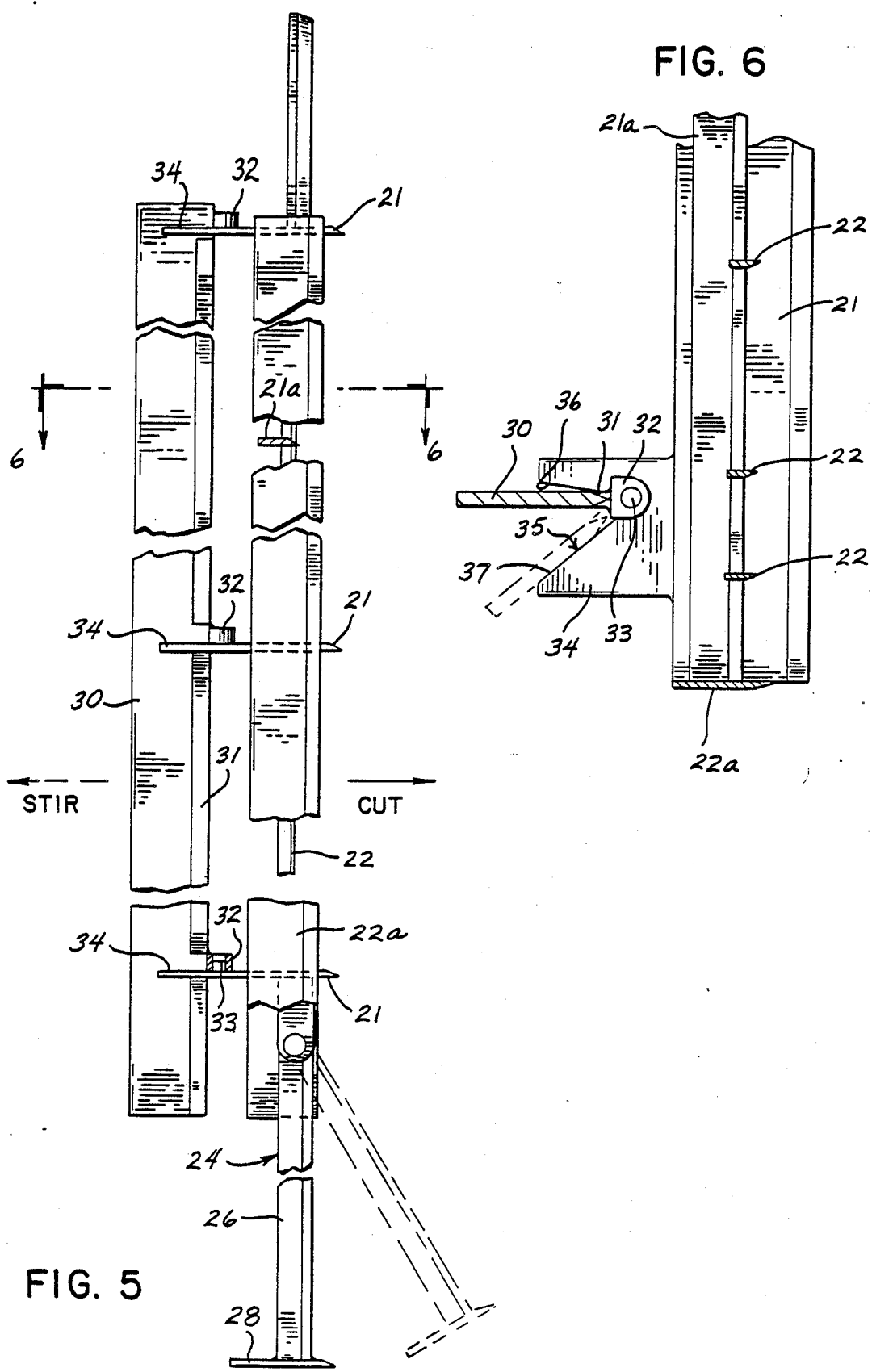

FOOD PROCESSING VAT

BACKGROUND OF THE INVENTION

U.S. Pat. Re. 29,967 describes a cheese making vat composed of an outer, generally oval shell, which is spaced outwardly of an inner processing vessel. The vessel is composed of a pair of generally cylindrical sections that intersect along vertical apices so that the vessel, in horizontal section, has a generally figure-8 shape. An agitator mechanism is located in each cylindrical section and comprises a reversible vertical shaft that carries a radially extending frame composed of a series of vertical and horizontal blades. One edge of each blade is sharpened, while the opposite edge is blunt. When the frame is rotated in the cutting direction, the sharpened edges lead in the direction of rotation to cut the curd and when the frame is rotated in the opposite or stirring direction, the blunt edges lead in the direction of rotation to provide a stirring action.

During the agitation it has been found that the fragile curd particles can be shattered by the sharp apices or edges that connect the cylindrical vessel section, causing fat loss and the generation of excessive fines.

As disclosed in U.S. patent Re.29,967, a plurality of hollow beams space the lower surfaces of the cylindrical sections from the bottom of the outer shell and a heating medium, such as steam, is introduced through a manifold into each of the beams and is discharged from the beams through a plurality of ports which are located along the sides of the beams. The steam them flows upwardly in the space between the cylindrical sections and the shell to heat the curds and whey.

To control the heating, a temperature sensing device is mounted within a well or recess in one of the cylindrical sections of the vessel, as described in U.S. Pat. No. Re. 29,967. During the agitation, a portion of the curds may be directed into the well, with the result that fat loss can occur and excess fines can be developed.

The food processing vat, as disclosed in U.S. Pat. Re. 29,967, also includes one or more swinging blades which are mounted on the frame. The swinging blades are constructed so that when the frame is rotated in the cutting direction, the sharpened edge of the swinging blade will lead in the direction of rotation and when the frame is rotated in the opposite stirring direction, the blade will swing to a position where a side surface is disposed generally normal to the direction of rotation, to thereby provide greater frontal area for stirring.

SUMMARY OF THE INVENTION

The invention is directed to a food processing vat that is an improvement to that disclosed in U.S. Pat. Re.29,976. The vat includes an outer, generally oval-shaped shell and a processing vessel to contain a mixture of curds and whey is spaced inwardly of the shell and is composed of a pair of generally cylindrical sections that intersect along vertical apices that extend the full height of the cylindrical sections. Each apex is generally rounded and is provided with a radius in the range of 1:6 to 1:12 with respect to the radius of the cylindrical section. It has been found that this specific relationship of the radius of the apex to the radius of the cylindrical section of the vessel is important in providing the proper flow of the product within the vessel, as well as preventing shattering of the curds which can result in fat loss and the development of excess fines.

A series of parallel longitudinal beams space the bottom of the cylindrical sections of the vessel from the bottom of the shell and a heating medium, such as steam, is introduced into the space between the vessel and the side walls of the shell, at locations disposed outwardly of each apex. The heating medium flows upwardly in the space to heat the product. This construction results in a better distribution of heat to the product with an increase of yield.

In accordance with a feature of the invention, an agitator mechanism is mounted in each cylindrical section of the vessel and each agitator mechanism includes a vertical reversible shaft that carries a radially extending frame composed of a series of horizontal and vertical blades. In addition, a vertical swinging blade is mounted for pivotal movement on the outer end of the frame and the swinging blade is provided with a sharpened vertical edge. The blade is freely swingable from a cutting position where the sharpened edge leads in the direction of rotation to an angular position where the blade is disposed at an angle to the direction of rotation and the trailing edge of the blade is located adjacent the side wall of the cylindrical section. The swinging blade construction provides improved agitation for the curds and whey or other food product, particularly in the area adjacent the side walls of the cylindrical sections.

As a further feature of the invention, the supply of the heating medium is controlled by a resistance temperature detector which is attached to the outer wall of the vessel. The detector will sense the temperature of the food product and control the supply of heating medium or steam to the vat. The detector eliminates the need for a temperature sensing recess or well in the wall of the cylindrical section, as used in the past, and correspondingly eliminates possible shattering of curd and generation of fines as occurred in the past when the curd was driven into the temperature sensing well.

Other objects and advantages will appear in the course of the following description.

DESCRIPTION OF THE DRAWINGS

The drawings illustrate the best mode presently contemplated of carrying out the invention.

In the drawings:

FIG. 5 is an end view of a frame; and

FIG. 6 is an enlarged fragmentary section taken along line 6–6 of FIG. 5.

DESCRIPTION OF THE ILLUSTRATED EMBODIMENT

Figure 1:
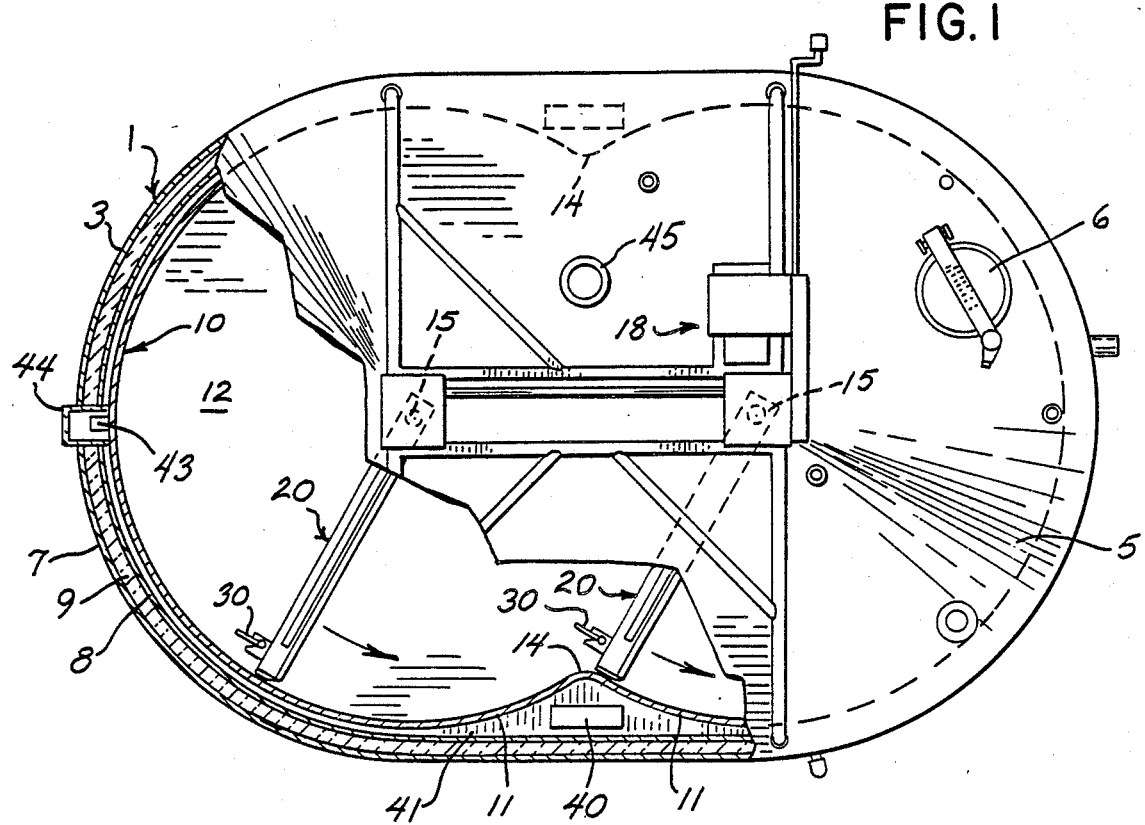
FIG. 1 is a top plan view with parts broken away in section.

The drawings illustrate a food processing vat which has particular application for processing curds and whey in a cheese making process. The vat includes an outer shell 1, which is mounted on a suitable supporting structure 2. Shell 1 includes a generally oval side wall 3 and a bottom wall 4 and a domed top or roof 5. A manhole is provided in roof 5 for access to the interior of the vat and the manhole is enclosed by a gasketed lid 6 so that the interior of the vat is completely sealed to the atmosphere.

The side wall 3 of shell 1 is composed of an outer metal layer 7, an inner metal layer 8, which border a layer of insulation 9. The inner and outer members 7,8 can be formed of a metal, such as stainless steel.

Located within shell 1 is a vessel 10 that contains the food product, such as a mixture of curds and whey. Vessel 10 is preferably constructed of a metal, such as stainless steel, and is composed of a pair of generally cylindrical sections 11, each of which includes a bottom wall 12, which is supported above the bottom wall 4 of shell 1 by a series of generally parallel box-shaped beams 13.

Cylindrical sections 11 intersect so that vessel 10 is provided with a generally figure-8 configuration. The cylindrical sections 11 intersect at a pair of spaced vertically extending apices 14 which extend the full height of the sections 11.

As a feature of the invention, there is a specific ratio between the radius of each apex 14 and the radius of the cylindrical section 11. More specifically, it has been found that the radius of each apex should be in the range of 1:6 to 1:12 with respect to the radius of the cylindrical section 11, and preferably at a ratio of 1:9. With this ratio, the optimum flow characteristics of the product is obtained within vessel 10, while minimizing shattering of the curd on the edge of the apex 14.

An agitation system is incorporated with each cylindrical section 11 and the agitation system includes a rotatable vertical shaft 15 which is located centrally of each section 11 and the lower end of each shaft 15 is journalled in a thrust bearing assembly 16 which is mounted on the bottom wall 12 of the respective section 11. The upper end of each shaft 15 extends through the peak 17 of roof 5 and a reversible drive mechanism 18, which can be constructed, as shown in U.S. Pat. No. Re. 29,967, is mounted on roof 5 and is operably connected to the upper end of each shaft 15 to drive the shafts in a reversible manner. The drive mechanism of patent Re. 29,967 is incorporated herein by references.

The agitation system also includes a frame 20 which extends radially outward from each shaft 15 and frame 20 is composed of a plurality of horizontal frame members 21 or blades which are connected by vertical frame members or blades 22. The vertical blade 22a at the outer end of the frame connects the outer ends of horizontal blades 21 and has the greater width and thickness than blades 22, while a horizontal blade 21a is positioned between the uppermost pair of horizontal blades 21 and has a lesser width and thickness than blades 21. Corresponding edges of frame members 21,22 and 21a,22a are sharpened and when the frame 20 is rotated in the cutting direction, the sharpened edges will lead in the direction of rotation to cut the curd.

As shown in FIGS. 5 and 6, horizontal blades 21 have a substantially greater thickness and width than the vertical blades 22. In practice, the horizontal blades have a width in the range of 3.5:1 to 4.5:1 with respect to the width of the vertical blades and have a thickness in the range of 3.5:1 to 4.5:1 with respect to the thickness of the vertical blades. As an example, horizontal blades 21 can have a thickness of about ¼ inch and a width of approximately 4 inches, while the vertical blades have a thickness of 1/16 inch and a width of approximately 1 inch. The upper end of each frame 20 is connected to the respective shaft 15 by an upper frame section 23 and the edges of the blades which compose the upper frame section 23 that lead in the cutting direction are sharpened.

Mounted for pivotal movement on the lower end of each frame 20 is a lower frame section 24. A pair of bars 25 extend downwardly from the lowermost horizontal blade 21 of frame 20 and the lower frame section 24 is mounted for pivotal movement on the bars 25. The lower frame section 24 includes a plurality of spaced vertical blades 26, which are connected along their upper edges by a horizontal blade 27. The lower ends of vertical blades 26 are connected to a relatively wide horizontal blade 28, as shown in FIG. 5. The edges of blades 26, 27 and 28 which lead in the cutting direction are sharpened, while the opposite edges of the blade are blunt. When frame 20 is rotated in the cutting direction, the vertical blades 26 will be held in a substantially vertical orientation, as shown in FIG. 5, and the sharpened edges will cut the curd. When the frame 20 is rotated in the opposite or stirring direction, lower section 24 will freely pivot to a trailing position, so that the horizontal blade 28 will be located at an angle to the horizontal to provide greater frontal area and provide a stirring action along the bottom of the vessel 10.

As a feature of the invention, the vat includes a vertical swingable blade 30 which is mounted at the outer end of each frame 20. Blade 30 has a sharpened edge 31 which leads in the cutting direction and a series of annular bosses 32 are secured, as by welding to spaced locations along the length of sharpened edge 31, and the bosses are journalled on upstanding pins 33 on plates 34 that extend outwardly from the blunt edges of horizontal blades 21. As best shown in FIG. 6, the outer edge of each plate 34 is provided with a generally V-shaped notch 35 which is bordered by a pair of edges 36 and 37. When frame 20 is rotated in the cutting direction, the sharpened edge 31 of blade 30 will face in the cutting direction, and when the frame is rotated in the opposite or stirring direction, blade 30 will pivot and engage the edge 37, to thereby position blade 30 at an acute angle with respect to the direction of rotation, as seen by the dashed lines in FIG. 6. The acute angle position provides greater frontal area for the stirring action, and aids in agitating and moving the curds from the wall of the vessel 10 to thereby provide a more efficient agitation system.

Figure 3:
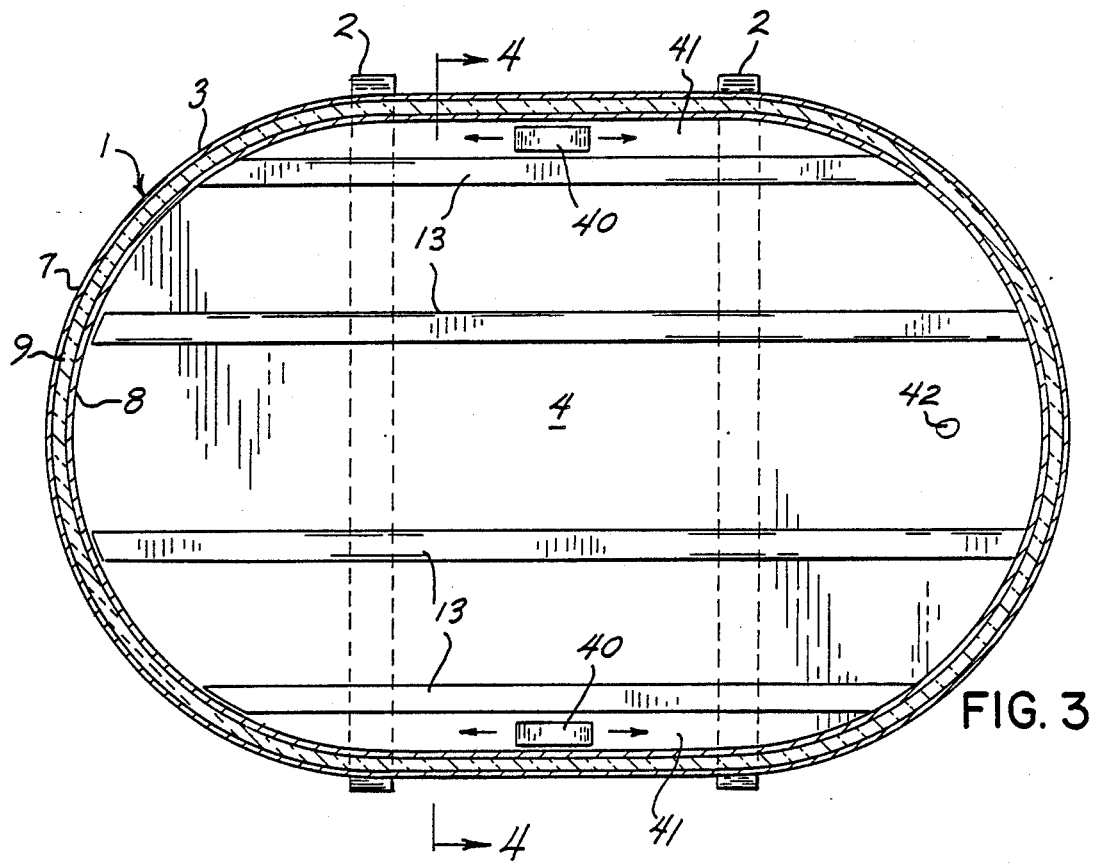
FIG. 3 is a horizontal section showing the heating system.
Figure 2:
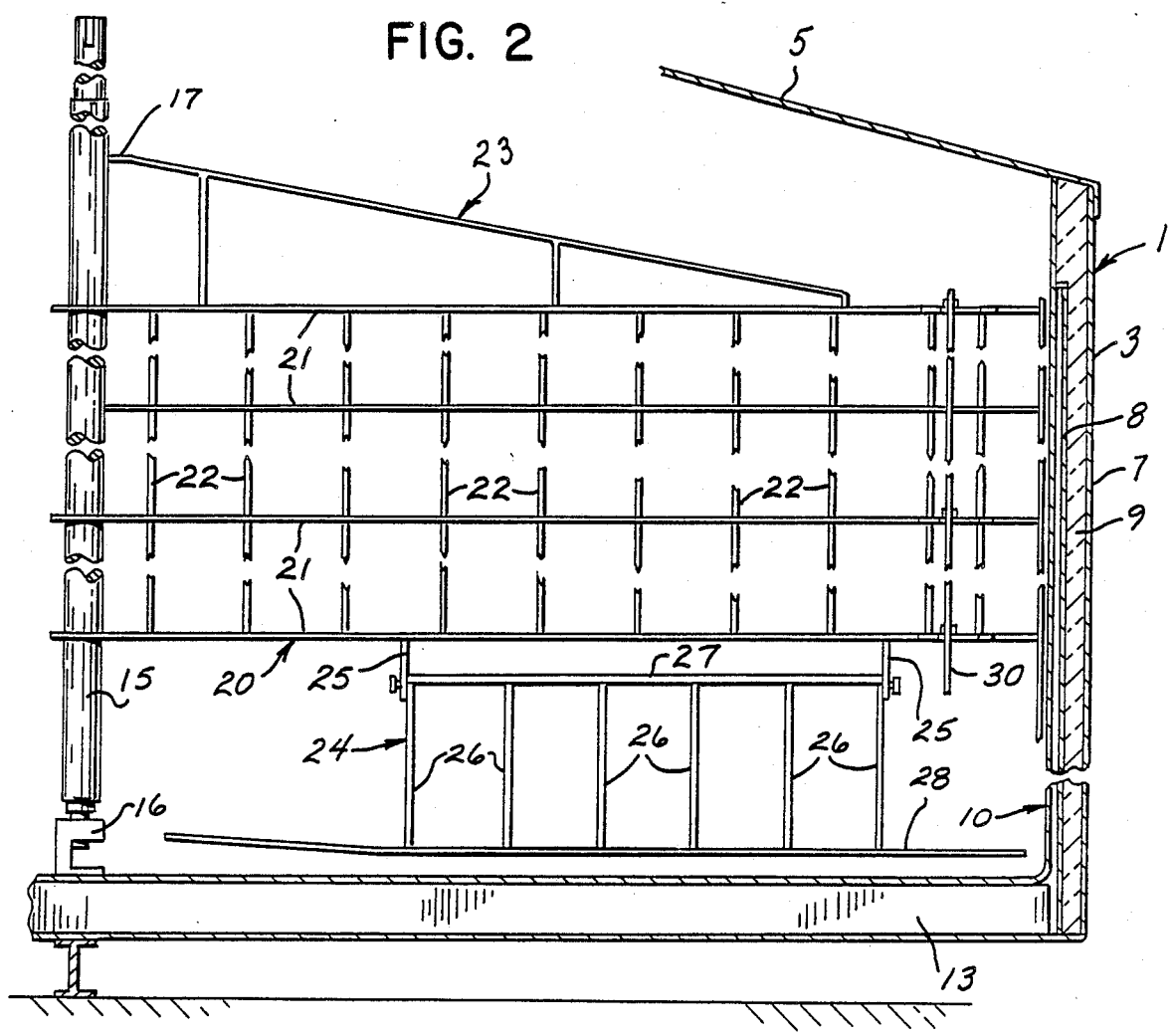
FIG. 2 is a vertical section showing an agitator frames.
Figure 4:
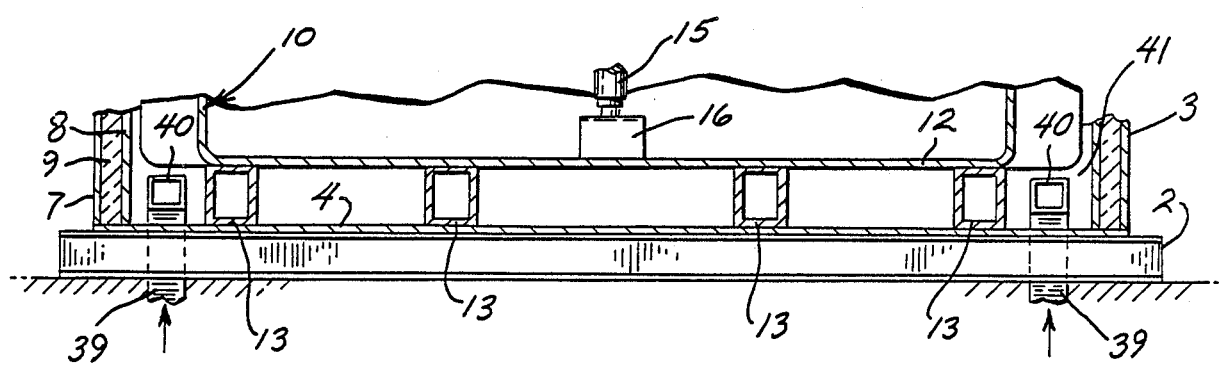
FIG. 4 is a section taken along line 4–4 of FIG. 3.

To heat the curds and whey, or other product contained within vessel 10, a pair of conduits 39 extend upwardly through bottom wall 4 of shell 1. Conduits 39 are connected to a suitable source of heating medium, such as steam, and the upper ends of the conduits, as shown in FIGS. 3 and 4, carry a horizontal head 40 having outlets in opposite ends. The heating medium is discharged from heads 40 horizontally into the space or chamber 41 between shell 1 and vessel 10 at locations disposed outwardly of apices 14. As seen in FIG. 4, the outermost beams 13 close off the lower end of chamber 41. The chamber 41 extends continuously around the entire periphery of the vessel 10. With this heating system, the bottom of vessel 10 is not directly subjected to the heating medium and the heat is more uniformly distributed into chamber 41 between shell 1 and vessel 10 to provide better heat distribution and an increase in yield.

Condensate can be drained from chamber 41 through a suitable drain 42.

To control the supply of the heating medium, a resistance temperature detector 43 is mounted on the outer wall of vessel 10 and is contained in a closed chamber or well 44, as seen in FIG. 1. Detector 32 senses the temperature of the product in vessel 10. and controls the supply of heating medium or steam through conduits 39. The use of the detector eliminates the need for a well or recess in the inner wall of vessel 10, which formerly housed a temperature sensing mechanism. By eliminating the well, shattering of the curd as the curd was thrown into the well, in prior practice, is eliminated, thereby reducing the generation of fines.

The curds and whey or other food product is introduced into the vessel 10 through an inlet 45 in roof 5. When shafts 13 are rotated in the direction of the solid arrows in FIG. 1, the sharp edges of blades of each frame 20 will lead, and act to cut the curd mass into cube-like chunks. After cutting, the curds are slowly agitated during cooking and the agitation is provided by reversing rotation of shafts 13, so that the blunt edges of blades 21, 22 and 26 lead in the direction of rotation. In addition, on reversal of rotation of shafts 13, blades 30 will swing to the angular position to provide greater frontal area to increase the stirring action along the side wall of the vessel 10, while lower blade 28 will freely trail to the inclined position to provide effective stirring along the bottom of the vessel.

In both the cutting and stirring modes, the product discharged from one section 11 of vessel 10 will be directed toward the shaft 13 of the other section 10 with the result that there is agitation throughout the entire area of each section, thereby eliminating dead spots in the flow-pattern. As the apices 14 are radiused, shattering of the curd chunks with a resultant increase in fines is minimized.

As the blades are fixed to frames 20, it is not necessary to remove or install different blades or implements during the cheese making operation for the same implements are used in both the cutting and stirring operations. This feature eliminates the necessity of opening the vat to remove and replace implements, thus ensuring that the vat is maintained in a sealed condition to minimize contamination.

The vat of the invention can also incorporate a clean-in-place system, not shown, in which a series of nozzles are mounted in vessel 10 and a cleaning liquid can be introduced through the nozzles to completely clean the interior surface of the vessel after the cheese making operation has been completed.

Various modes of carrying out the invention are contemplated as being within the scope of the following claims particularly pointing out and distinctly claiming the subject matter which is regarded as the invention.

1. A food processing vat, comprising an outer shell having a generally oval side wall and a bottom wall, a vessel spaced within the shell and composed of a pair of interconnected generally cylindrical members, the cylindrical members intersecting along a pair of vertically extending apices, (each apex being generally rounded and having a radius in the range of 1:6 to 1:12 with respect to the radius of a cylindrical member), and agitation means disposed within each cylindrical member for agitating the product therein.

2. The vat of claim 1, wherein each apex extends the full height of the vessel.

3. The vat of claim 1, wherein said agitation means comprises a reversible rotatable vertical shaft mounted centrally of each cylindrical members, and an agitator frame extending radially outward from each shaft.

4. A food processing vat, comprising an outer shell having a generally oval side wall and a bottom wall, a vessel to contain a product and spaced inwardly of the shell and composed of a pair of intersecting generally cylindrical members, said members being joined together along a pair of vertical apices, said vessel having a bottom wall spaced above the bottom wall of said shell, the side wall of said shell being spaced outwardly of said vessel to provide a chamber therebetween, and supply means for supplying a heating medium to the lower end of said chamber, and wall means disposed in the space between the bottom wall of said vessel and the bottom wall of said shell for preventing flow of said heating medium from said chamber to said space.

5. The vat of claim 4, and including a temperature sensing mechanism disposed within said chamber for sensing the temperature of said product and controlling the flow of heating medium to said chamber.

6. The vat of claim 4, wherein said wall means comprises a pair of spaced generally hollow beams each extending the length of said vessel.

7. The vat of claim 4, wherein said supply means comprises a conduit connected to a source of heating medium and disposed outwardly of one of said apices, said conduit having a generally horizontal outlet opening.

8. The vat of claim 4, wherein said chamber extends continuously around said vessel.

9. The vat of claim 7, wherein said conduit comprises a vertical section and a horizontal section connected to the upper end of said vertical section, said horizontal section having outlets in opposite ends.

10. The vat of claim 1, wherein said cylindrical members have the same radius.

11. A food processing vat, comprising a vessel including a side wall and a bottom, a rotatable shaft disposed within the vat, reversible drive means for rotating said shaft, a frame extending radially from said shaft toward said side wall, a vertical blade disposed adjacent the outer end of the frame and having a sharpened vertical edge, a plurality of support members on said frame, pivot means for pivotally mounting said blade for pivotal movement on said support members, at least one of said support members having a notch bordered by a pair of angular edges, said blade being disposed in said notch, said notch being constructed and arranged such that operation of said drive means in one direction will cause the sharpened edge of said blade to lead in the direction of rotation to cut the food product and operation of said drive means in the opposite direction will move said blade into engagement with one of said edges so that said blade is disposed at an acute angle with respect to said frame to thereby stir the food product.

12. The vat of claim 11, wherein said one support member comprises a horizontal plate extending in a circumferential direction of said frame.

13. The vat of claim 12, wherein said pivot means interconnects said sharpened edge with said plate.

14. The vat of claim 13, wherein said pivot means comprises an upstanding pin on said plate and an annular boss secured to said sharpened edge and engaged with the respective pin.

15. The vat of claim 11, wherein said notch is generally V-shaped, one edge extends generally normal to the frame and the other edge extends at an acute angle with respect to the frame.

16. The vat of claim 11, wherein said frame also includes a plurality of fixed horizontal blades and a plurality of fixed vertical blades connecting said horizontal blades.

17. The vat of claim 16, wherein said horizontal blades have a greater thickness and a greater width than said vertical blades.

18. The vat of claim 17, wherein said horizontal blades have a thickness of about ¼ inch and said vertical blades have a thickness of about 1/16 inch.

19. The vat of claim 18, wherein said horizontal blades have a width of about 4 inches and said vertical blades have a width of about one inch.

20. The vat of claim 17, wherein said horizontal blades have a thickness in the range of 3.5:1 to 4.5:1 with respect to said vertical blades and said horizontal blades have a width in the range of 3.5:1 to 4.5:1 with respect to the width of said vertical blades.

21. The vat of claim 10, wherein said support members are spaced vertically on said frame.

22. A food processing vat, comprising a vessel including a side wall and a bottom, a rotatable shaft disposed within the vat, reversible drive means for rotating said shaft, a frame extending radially from said shaft toward said side wall, a plurality of fixed horizontal blades extending outwardly in vertically spaced relation from said shaft, a plurality of fixed vertical blades disposed in spaced horizontal relation and interconnecting said horizontal blades, said horizontal blades including an upper horizontal blade connecting the upper ends of said vertical blades and a lower horizontal blade connecting the lower ends of said vertical blades and a group of intermediate horizontal blades spaced between said upper horizontal blade and said lower horizontal blade, said blades having opposed edges with one edge of each blade being sharpened and the other edge of each blade being generally blunt, said horizontal blades having a thickness in the range of 3.5:1.0 to 4.5:1.0 with respect to the thickness of said vertical blades and said horizontal blades having a width in the range of 3.5:1.0 to 4.5:1.0 with respect to the width of said vertical blades.

* * * * *

UNITED STATES PATENT AND TRADEMARK OFFICE
CERTIFICATE OF CORRECTION

PATENT NO. : 4,938,424
DATED : July 3, 1990
INVENTOR(S) : ALLEN J. PITTELKO

It is certified that error appears in the above-identified patent and that said Letters Patent is hereby corrected as shown below:

ON THE TITLE PAGE:
At "[56] U.S. PATENT DOCUMENTS" insert --Re.29,967  4/1979  Hazen  241/98--; Col. 5, Line 54, CLAIM 1, Delete "("; Col. 5, Line 56, CLAIM 1, Delete ")"; Col. 5, Line 63, CLAIM 3, Delete "members" and substitute therefor --member--

Signed and Sealed this

Fourth Day of May, 1993

Attest:

MICHAEL K. KIRK

Attesting Officer

Acting Commissioner of Patents and Trademarks